(12) United States Patent
Mori et al.

(10) Patent No.: US 10,899,004 B2
(45) Date of Patent: Jan. 26, 2021

(54) VIBRATOR, VIBRATION-TYPE DRIVING DEVICE, IMAGE FORMING APPARATUS, ROBOT, AND PAN HEAD

(71) Applicant: CANON KABUSHIKI KAISHA, Tokyo (JP)

(72) Inventors: Takao Mori, Tokyo (JP); Yoshiharu Irei, Fujisawa (JP); Masaaki Udagawa, Tsukuba (JP); Yu Takahashi, Yokohama (JP); Takayuki Tsukimoto, Fujisawa (JP); Hiroyuki Seki, Oyama (JP); Satoshi Tsuchiya, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 626 days.

(21) Appl. No.: 15/566,175

(22) PCT Filed: Mar. 30, 2016

(86) PCT No.: PCT/JP2016/001851
§ 371 (c)(1),
(2) Date: Oct. 12, 2017

(87) PCT Pub. No.: WO2016/170741
PCT Pub. Date: Oct. 27, 2016

(65) Prior Publication Data
US 2018/0093375 A1   Apr. 5, 2018

(30) Foreign Application Priority Data

Apr. 24, 2015 (JP) .................................. 2015-089580

(51) Int. Cl.
*H02N 2/16*   (2006.01)
*B25J 9/12*   (2006.01)
(Continued)

(52) U.S. Cl.
CPC .......... *B25J 9/126* (2013.01); *G03G 15/1615* (2013.01); *G03G 15/757* (2013.01);
(Continued)

(58) Field of Classification Search
CPC ............ H02N 2/00; H02N 2/16; G03G 15/00; G03G 15/16
See application file for complete search history.

(56) References Cited

U.S. PATENT DOCUMENTS 7,456,547 B2 * 11/2008 Kurosawa ............ H02N 2/0065
310/323.04
2011/0241488 A1   10/2011 Kimura

FOREIGN PATENT DOCUMENTS

JP   7-67363 A   3/1995
JP   8-298792 A   11/1996
(Continued)

*Primary Examiner* — J. San Martin
(74) *Attorney, Agent, or Firm* — Canon U.S.A., Inc. I.P. Division (57) ABSTRACT

A vibrator of a vibration-type driving device according to an aspect of the present invention includes a first vibrating member that includes first protrusions protruding in a first direction, a second vibrating member that includes second protrusions protruding in a direction that is opposite to the first direction, and an electric-mechanical energy conversion element that is fixed to the first vibrating member. The first protrusions and the second protrusions each have a hollow structure, and the first vibrating member and the second vibrating member are disposed in such a manner that a surface of the first vibrating member on which the first protrusions are not formed and a surface of the second vibrating member on which the second protrusions are not formed face each other.

18 Claims, 10 Drawing Sheets

(51) Int. Cl.
 *H02N 2/00* (2006.01)
 *G03G 15/00* (2006.01)
 *G03G 21/16* (2006.01)
 *G03G 15/16* (2006.01)
 *G03B 17/56* (2006.01)

(52) U.S. Cl.
 CPC ....... *G03G 21/1647* (2013.01); *H02N 2/0015* (2013.01); *H02N 2/0065* (2013.01); *H02N 2/163* (2013.01); *H02N 2/22* (2013.01); *G03B 17/561* (2013.01); *G03G 2221/1657* (2013.01)

(56) References Cited

FOREIGN PATENT DOCUMENTS

| | | | |
|---|---|---|---|
| JP | 2000-350481 | A | 12/2000 |
| JP | 4350208 | B2 | 10/2009 |
| JP | 2011234608 | A | 11/2011 |

* cited by examiner

VIBRATOR, VIBRATION-TYPE DRIVING DEVICE, IMAGE FORMING APPARATUS, ROBOT, AND PAN HEAD

TECHNICAL FIELD

The present invention relates to a vibrator that is preferably used in a vibration-type driving device, which is, for example, a so-called vibration-wave motor that is driven by a frictional force generated as a result of bringing a movable member into contact with such a vibrator, and relates to a vibration-type driving device that includes the vibrator, an image forming apparatus, a robot, and a pan head that includes an imaging apparatus and a sensor.

BACKGROUND ART

Since vibration-wave motors have characteristics to rotate at a low speed, to generate a high torque, and the like, such a vibration-wave motor has been put to practical use as, for example, an autofocus drive motor in a photographing lens of a single-lens reflex camera, and in recent years, there has been a need for a further improvement in productivity and a further reduction in the manufacturing costs. In view of such problems, in PTL 1 and PTL 2, there has been proposed a vibration-wave motor including a vibrating member that forms a vibrator and that is manufactured by using press working, which is a method of processing plate materials.

PTL 1 discloses a vibration-wave driving device that includes a vibrator, which is formed by press working, and a contact member, which comes into contact with and applies pressure to the vibrator via a pressing unit, and that has a configuration in which the vibrator and the contact member are caused to move relative to each other.

In PTL 2, a vibrating member has a circular plate-like shape and includes, as driving portions thereof, a plurality of first projecting portions and a plurality of second projecting portions on each of which bending has been performed in such a manner that the first projecting portions and the second projecting portions project toward different sides with respect to a neutral plane of vibration generated in the vibrating member, the neutral plane serving as the boundary between the first projecting portions and the second projecting portions. Each of the first and second projecting portions comes into contact with one of a first contact member and a second contact member, which are disposed on the two surface sides of a vibrator, such that the vibrator and the contact members are caused to move relative to each other.

CITATION LIST

Patent Literature

PTL 1: Japanese Patent Laid-Open No. 8-298792
PTL 2: Japanese Patent No. 4350208

SUMMARY OF INVENTION

Technical Problem

There is a need for vibration-wave motors to be manufactured at low manufacturing costs and to be able to generate a high torque. In order to enable such a vibration-wave motor to generate a high torque, a motor pressing force, which is a pressing force between a vibrator and a contact member, and a frictional force generated in a friction surface need to be increased. However, in this case, a contact pressure generated in a contact portion is increased, and as a result, the durability of a vibration-type driving device will deteriorate. Thus, a mechanism that increases the area of a friction surface is required.

The area of a contact surface is the total area of all the friction surfaces of projections of a vibrator, and in PTL 1 and PTL 2, since projecting portions are formed on both the front and rear surfaces of the vibrating member, which is formed of a single plate material, a sufficiently large contact area may not be obtained.

In addition, since the vibrating member is formed of a thin plate, when a high motor pressing force is applied by a high torque motor, the vibrating member elastically deforms due to the motor pressing force and a frictional force, so that a sufficient driving force may not be transmitted to the contact member.

Accordingly, an aspect of the present invention relates to a vibrator including a first vibrating member that has a first surface and a second surface, which is opposite to the first surface, a second vibrating member that has a third surface and a fourth surface, which is opposite to the third surface, and an electric-mechanical energy conversion element that is fixed to the first vibrating member. The first vibrating member includes a first protrusion protruding from the first surface in a direction having a first direction component perpendicular to the first surface. The second vibrating member includes a second protrusion protruding from the third surface in a direction having a second direction component, which is opposite to the first direction component. The first protrusion and the second protrusion each have a hollow structure, and the first vibrating member and the second vibrating member are disposed in such a manner that the second surface and the fourth surface face each other.

Further features of the present invention will become apparent from the following description of exemplary embodiments with reference to the attached drawings.

Since a plurality of protrusions greater than those formed in the related art are formed on the front and rear surfaces of the vibrator, the area of a friction surface can be increased. Therefore, a vibration-type driving device that can at least generate a high torque or that can at least have a high durability or a vibration-type driving device that can generate a high torque and that has a high durability can be provided.

DESCRIPTION OF EMBODIMENTS

First Embodiment

Figure 1:
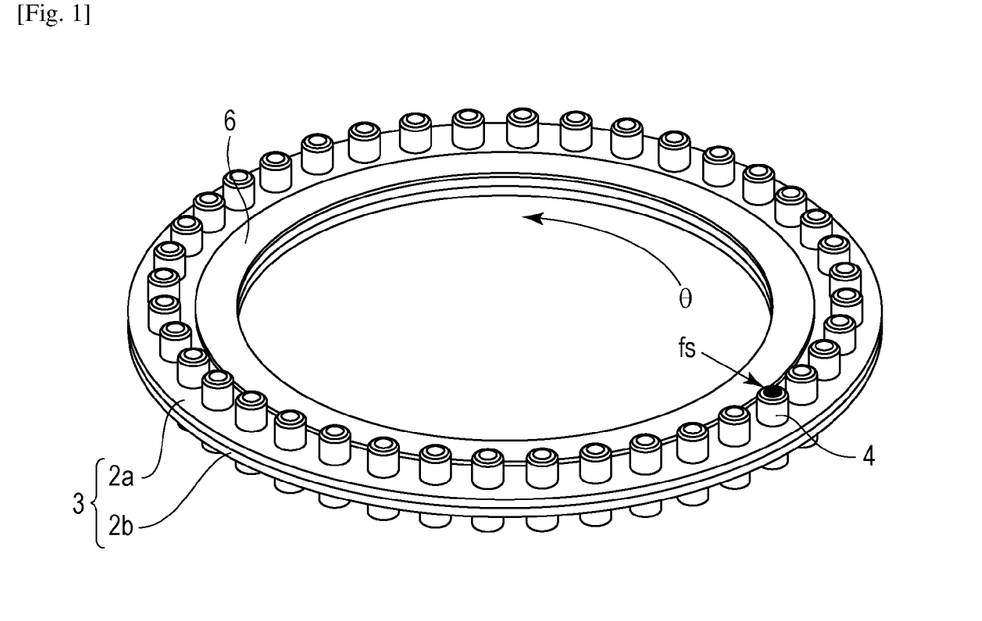
FIG. 1 is a perspective view illustrating an example of a vibrator according to a first embodiment of the present invention.
Figure 2:
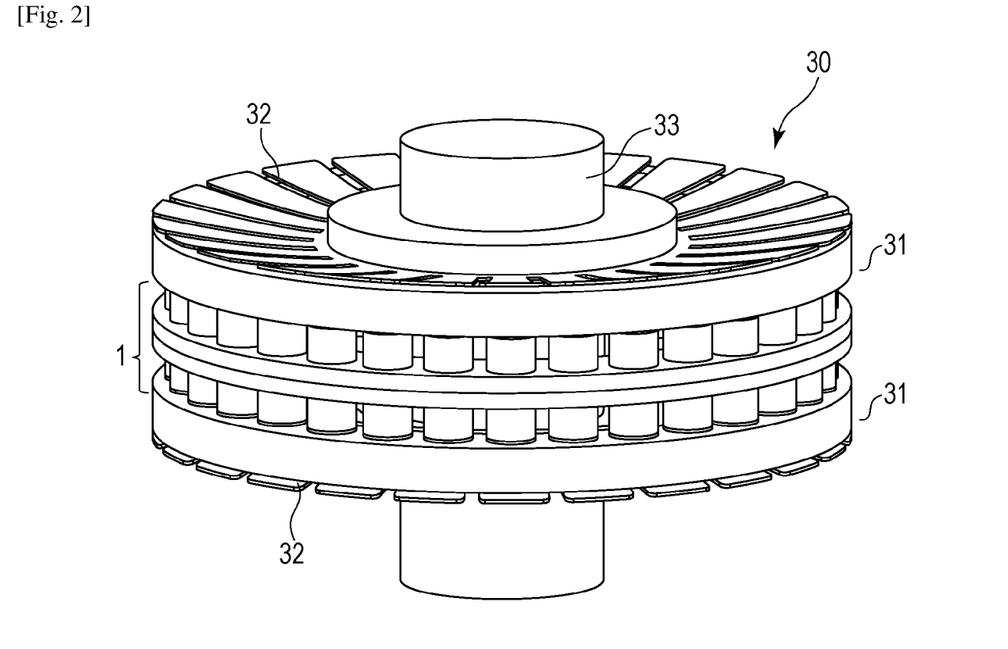
FIG. 2 is a diagram illustrating an example of a vibration-type driving device according to the present invention.
Figure 3:
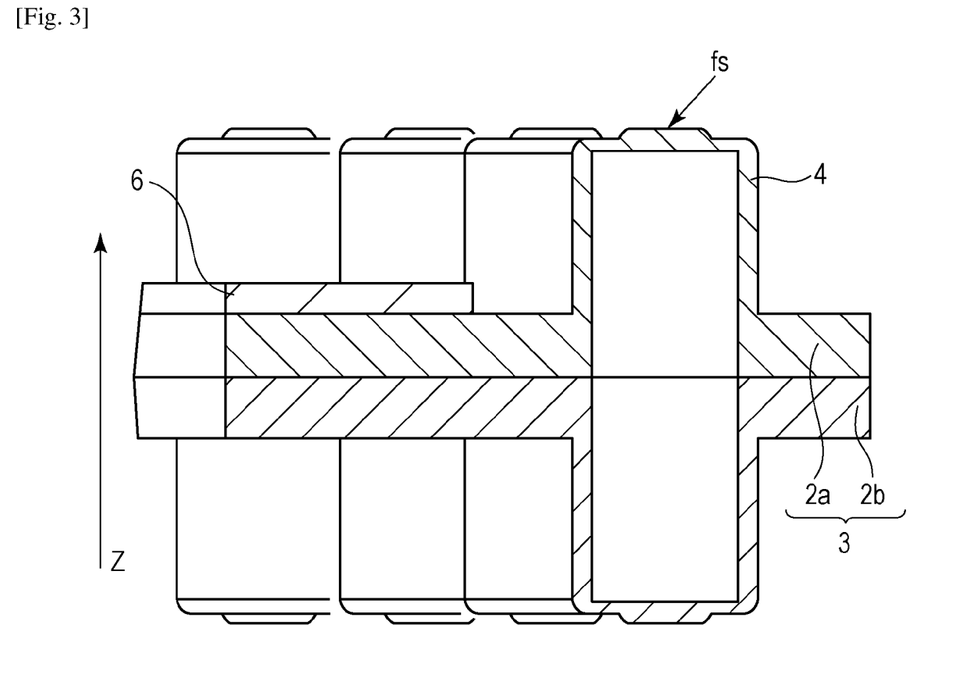
FIG. 3 is a sectional view illustrating an example of a vibrating portion according to the first embodiment of the present invention.

An example of a vibrator according to a first embodiment of the present invention is illustrated in FIG. 1 and FIG. 3, and a vibration-type driving device that includes the vibrator according to the first embodiment is illustrated in FIG. 2. FIG. 1 is a perspective view of a vibrator 1. The vibrator 1 includes a vibrating portion 3 that includes a plurality of vibrating members 2a and 2b and a piezoelectric element 6, which is an electric-mechanical energy conversion element. In the example illustrated in FIG. 1, the vibrating portion 3 and the piezoelectric element 6 each have a ring-like shape. Each of the vibrating members 2a and 2b includes protrusions 4 each having a cylindrical shape. Each of the protrusions 4 has a friction surface fs at an end thereof, and the protrusions 4 are disposed with an interval therebetween in a driving direction (circumferential direction). The term "cylindrical shape" denotes cylindrical shapes whose cross sections perpendicular to a height direction are a circular shape, an elliptical shape, a polygonal shape, and a polygonal shape with rounded corners. Contact members (not illustrated) are each disposed above the friction surfaces fs of the protrusions 4 of the vibrating member 2a or above the friction surfaces fs of the protrusions 4 of the vibrating member 2b, and a pressing mechanism applies a pressing force in a direction normal to the friction surfaces fs to the vibrator 1 and the contact members.

A vibration-type driving device 30 includes the vibrator 1, driven members 31 that are driven by the vibrator 1, pressing members 32 that apply a pressing force to the vibrator 1 and the driven members 31, and a shaft 33 extending through the centers of the vibrator 1 and the driven members 31. FIG. 2 illustrates the vibration-type driving device 30 that includes plate springs, which are examples of the pressing members 32. The driven members 31 come into contact with and apply pressure to the protrusions 4 and are driven by, for example, elliptical motion of the protrusions 4 generated as a result of applying an alternating-current voltage to an electrode of the vibrator 1. Accordingly, relative positions of the protrusions 4 and contact portions of the driven members 31 change in the driving direction. Here, the driving direction is a direction in which the driven members 31 are caused to move relative to the vibrator 1 as a result of being driven by the vibrator 1, and in the first embodiment, the driving direction refers to a direction θ (circumferential direction) illustrated in FIG. 1.

FIG. 3 is a diagram illustrating the cross section of the vibrating portion 3 illustrated in FIG. 1 in an enlarged manner for describing the details of the vibrator 1. The vibrating portion 3 includes two vibrating members 2, which are a first vibrating member 2a and a second vibrating member 2b, and the first vibrating member 2a and the second vibrating member 2b are superposed with each other in such a manner that a second surface of the first vibrating member 2a that is opposite to a first surface of the first vibrating member 2a, the first surface having the protrusions 4 formed thereon, and a fourth surface of the second vibrating member 2b that is opposite to a third surface of the second vibrating member 2b, the third surface having the protrusions 4 formed thereon, face each other.

That is to say, in the first embodiment, the vibrator 1 has the following configuration. The vibrator 1 includes the first vibrating member 2a, the second vibrating member 2b, and the piezoelectric element 6, which is an electric-mechanical energy conversion element and which is fixed to the first vibrating member 2a. The first vibrating member 2a has the first surface on which first protrusions 4 are formed and the second surface that is opposite to the first surface, and the second vibrating member 2b has the third surface on which second protrusions 4 are formed and the fourth surface that is opposite to the third surface. The first protrusions 4 protrude from the first surface in a direction having a direction component (positive Z direction in FIG. 3) perpendicular to the first surface, and the second protrusions 4 protrude from the third surface in a direction having a direction component (negative Z direction in FIG. 3) perpendicular to the third surface. The first vibrating member 2a and the second vibrating member 2b are joined together in such a manner that the second surface and the fourth surface face each other.

The piezoelectric element 6 is disposed at a position further toward an inner periphery side than the protrusions 4, and bending vibration having a plurality of peaks in the circumferential direction is generated in the vibrating portion 3 as a result of applying an alternating-current signal to an electrode pattern (not illustrated). This bending vibration generates a very small elliptical motion of the vibrating portion 3 and causes the contact members to move relative to the vibrating portion 3. The protrusions 4 increase the amplitude of the elliptical motion, and as the heights of the protrusions 4 are larger, a vibration-type driving device capable of producing a higher rotational driving force can be obtained.

In this case, the vibrator 1 according to the first embodiment has a configuration in which an output power can be extracted from contact surfaces of the protrusions 4 located on the top surface of the vibrator 1 and contact surfaces of the protrusions 4 located on the bottom surface of the vibrator 1. Thus, as the number of protrusions 4 is larger and accordingly, the total contact area in which a frictional force is generated is larger, the load on each of the contact surfaces decreases, so that the durability of the vibration-type driving device 30 can be improved. In the present invention, since the protrusions 4 are formed on only one surface of each of the vibrating members 2, compared with the case where protrusions are formed on the two surfaces of one vibrating member, a dense arrangement of protrusions can be realized, and this configuration is advantageous for the improvement in the durability of the vibration-type driving device 30.

A method of manufacturing the protrusions 4 will now be described. The vibrating members 2 and the protrusions 4 can be integrally formed by press working. More specifically, a member having a certain width in a radial direction, which is a ring-shaped plate member in the first embodiment, is prepared, and drawing is performed on the member in a thickness direction of the member so as to form the protrusions 4 each of which has a height larger than a plate thickness of the original member (material). Each of the protrusions 4 can be formed so as to have a hollow structure by the above processing method, and this hollow structure allows the protrusions 4 to be easily formed high. Each of the end portions of the protrusions 4 has a thin-plate-shaped spring structure and has flexibility in a direction in which a pressing force is applied. Deformation amounts of the contact surfaces fs in the direction normal to the contact surfaces fs due to the motor pressing force are mainly determined by the thicknesses of the peripheral portions of the contact surfaces fs.

Figure 4:
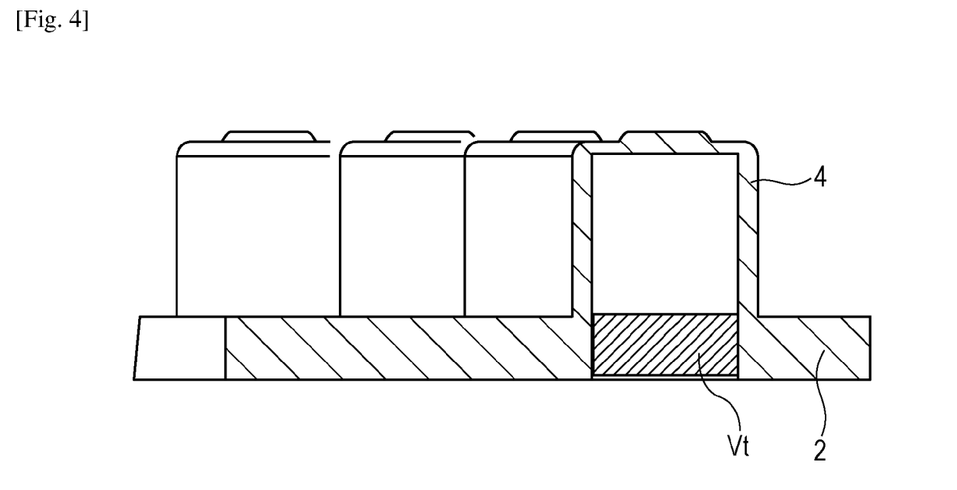
FIG. 4 is a diagram illustrating an exemplary method of manufacturing the vibrating portion.

In FIG. 4, the entire volume of the material forming the protrusions 4 is equal to a volume Vt of a portion of the original plate member, the portion having been punched out. In order to increase the spring constant of each of the end portions, the thicknesses of the end portions need to be increased, and thus, a method of pushing away the material forming the inner surfaces of side walls of the protrusions 4 by scraping the inner surfaces was devised. By using this method, the side surfaces are formed so as to be thin, and the extra material obtained by forming the side surfaces thin is moved to the end portions, that is to say, the end portions are formed so as to be thick.

As described above, the protrusions 4 having a large height have a function of increasing the amplitude of feed motion. In the case where the heights of the protrusions 4 need to be increased, a sufficient volume of the material forming the side surfaces may be ensured by increasing the thickness of the original member. For example, in the first embodiment, a thick stainless steel ring plate having a predetermined width in a radial direction thereof and a thickness of 2 mm is prepared, and the protrusions 4 each having a height of 3 mm or more are formed by performing drawing on the thick stainless steel ring plate in the thickness direction of the thick stainless steel ring plate.

As described above, a designer may set the dimensions of the protrusions 4 in accordance with the specification of a motor and then set the thickness of a member required for manufacturing the protrusions 4 by press working.

A method of joining of the vibrating members 2 together will now be described. As described above, the vibrating portion 3 includes the two vibrating members 2, and the vibrating members 2 are superposed with each other in such a manner that the second surface of the first vibrating member 2a that is opposite to the first surface on which the protrusions 4 are formed, and the fourth surface of the second vibrating member 2b that is opposite to the third surface on which the protrusions 4 are formed face each other. A large area of a boundary portion between the vibrating members 2 can be joined together. In addition, the smaller the internal damping, the higher the performance of the vibration-type driving device 30, and thus, the two vibrating members 2 are joined together by solid-phase bonding.

In the structure described above, since members having the same shape are superposed with each other, the position of a joint portion of the members and the position of a neutral plane of bending vibration generated in the vibrating portion 3 substantially match each other. This structure keeps deformation that occurs at an interface between the vibrating members 2 small and suppresses an increase in the internal damping. Thus, the method of joining the vibrating members 2 together need not always be solid-phase bonding, and liquid phase bonding, such as brazing or soldering, and chemical bonding using an adhesive or the like, each of which has a lower cost than solid-phase bonding, may be employed depending on the application. Even in the case where one of these methods is employed, the vibrating members 2 can be used as portions of the vibrator 1 without causing a significant deterioration in the vibration characteristic of the vibrator 1.

Figure 5:
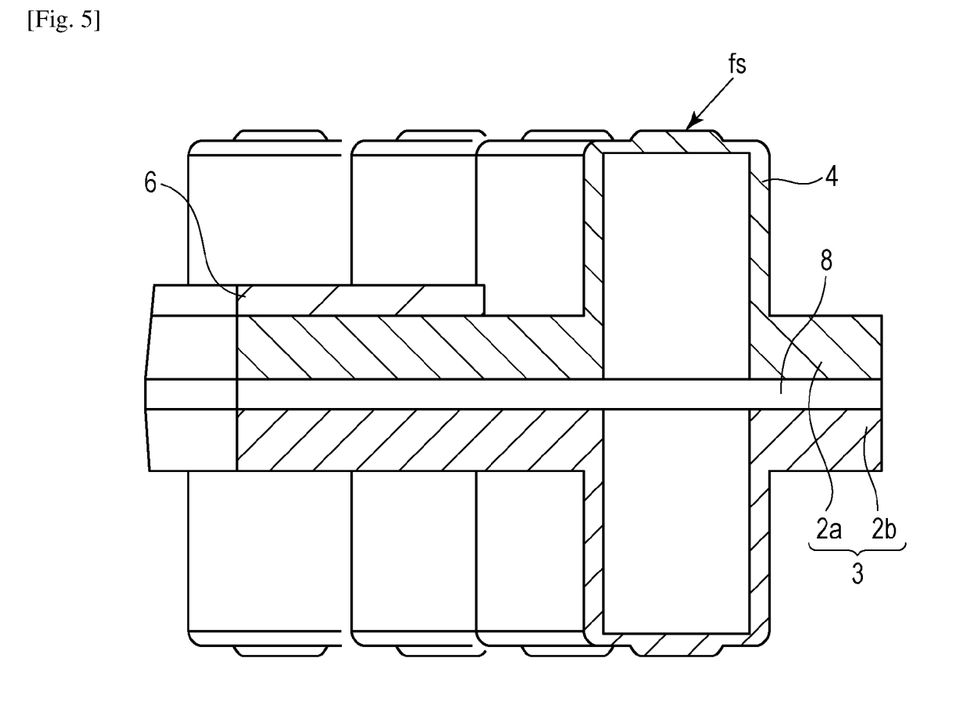
FIG. 5 is a sectional view illustrating an example of the vibrator that additionally includes an intermediate ring.

As described above, since a range in which the thickness of the vibrating portion 3 can be set is limited by the heights of the protrusions 4, in the case where the thickness of the vibrating portion 3 of the vibrator 1 is desired to be increased, an intermediate ring 8 that is used for adjusting the thickness of the vibrating portion 3 can be additionally provided as illustrated in FIG. 5. However, in this case, the joint portion is located at a position spaced away from the vibration neutral plane by a distance that is half the thickness of the ring 8, which is interposed between the vibrating members 2, and thus, there is a possibility that the deformation that occurs in the joint portion will be increased, which in turn leads to an adverse effect on the vibration characteristic of the vibrator 1. Thus, in the vibrator 1 that includes the vibrating portion 3 having a thickness of, for example, 1 mm or more and 5 mm or less, the thickness of the intermediate ring 8 may be half the thickness of one of the vibrating members 2 or less. In this case, the intermediate ring 8 can be used as a portion of the vibrator 1 without causing a significant deterioration in the vibration characteristic of the vibrator 1.

In contrast, in the case where the thickness of the vibrating portion 3 of the vibrator 1 is desired to be reduced, after the protrusions 4 have been formed, the thickness of the vibrating portion 3 may be adjusted by uniformly scraping off the second surface and the fourth surface of the vibrating members 2, which are to be joined together, by using a surface grinder.

A method of superposing the two vibrating members 2 with each other will now be described. The first vibrating member 2a includes the plurality of protrusions 4 including a first protrusion 4a and a third protrusion 4c that is adjacent to the first protrusion 4a. The second vibrating member 2b includes the plurality of protrusions 4 including a second protrusion 4b and a fourth protrusion 4d that is adjacent to the second protrusion 4b. Each of the plurality of protrusions 4 has a hollow structure, and the first protrusion 4a and the third protrusion 4c each include a wall portion projecting in a direction having a first direction component (positive Z direction) and a contact portion positioned at an end thereof. The second protrusion 4b and the fourth protrusion 4d each include a wall portion projecting in a direction having a second direction component (negative Z direction), which is opposite to the first direction component, and a contact portion positioned at an end thereof.

Figure 6:
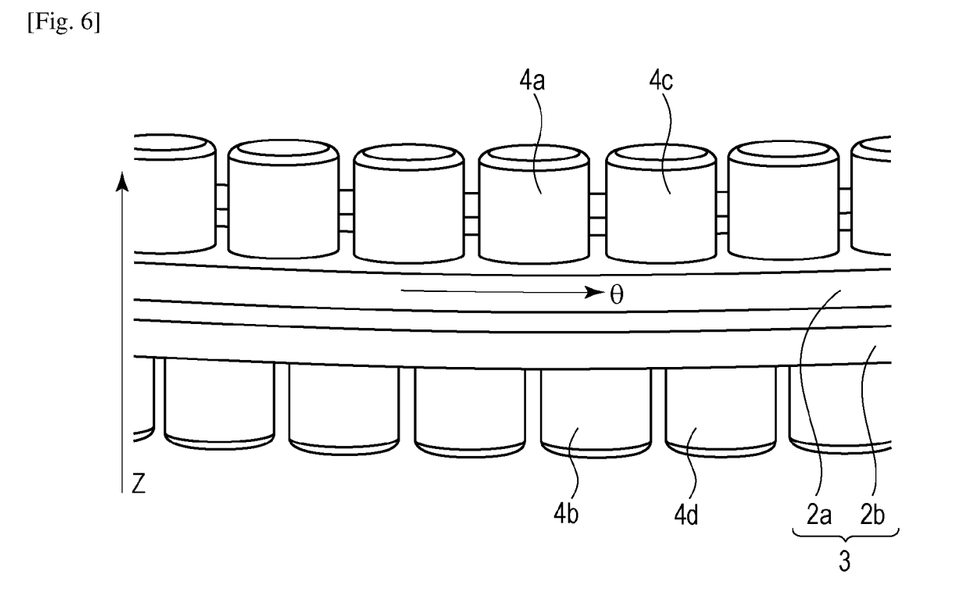
FIG. 6 is a diagram illustrating an exemplary configuration for reducing unevenness in the bending rigidity of the vibrator.

In each of the vibrating members 2, there is a difference in bending rigidity to bending vibration used for driving between the positions at which the protrusions are formed and the positions at which the protrusions are not formed. Thus, when the first and second vibrating members 2a and 2b are superposed with each other, if the positions of the protrusions 4 of the first vibrating member 2a are superposed with the positions of the protrusions 4 of the second vibrating member 2b, unevenness in the rigidity in the driving direction is more likely to be generated. Accordingly, for example, by displacing the positions of the protrusions 4 of the first vibrating member 2a and the positions of the protrusions 4 of the second vibrating member 2b relative to one another in a direction (direction θ in FIG. 6)

perpendicular to the first and second direction components as illustrated in FIG. 6, the rigidity of the vibrating portion 3 can be averaged.

A specific configuration will now be described with reference to FIG. 6. In a direction (direction θ in FIG. 6) perpendicular to the first direction component, the center of the second protrusion 4b is located between the center of the first protrusion 4a and the center of the third protrusion 4c. In this case, part of the wall portion of the first protrusion 4a and part of the wall portion of the second protrusion 4b are superposed with each other, and part of the wall portion of the second protrusion 4b and part of the wall portion of the third protrusion 4c are superposed with each other. As a result, the probability of the rigidity of the vibrating portion 3 in the driving direction becoming uneven can be reduced. Therefore, vibration having a desired amplitude can be evenly generated in the vibrating portion 3.

The second protrusion 4b may be located at a position between the first protrusion 4a and the third protrusion 4c in the direction θ, or the second protrusion 4b may be located at a position at which the second protrusion 4b is superposed with the first protrusion 4a and the third protrusion 4c in the direction θ as illustrated in FIG. 6. Note that the unevenness in the rigidity can be reduced by a method using a portion that can be formed during a process of performing press working on the vibrating members 2. For example, notch-shaped portions 7 such as those illustrated in FIG. 7, cutout portions whose effect of reducing the unevenness in the rigidity have been confirmed during a designing process, or the like may be additionally formed in portions of the vibrating members 2, the portions having high rigidity, and thus, a simple design of the vibrating members 2 and an inexpensive change in the manufacturing process can be measures for reducing the unevenness in the rigidity.

Figure 7:
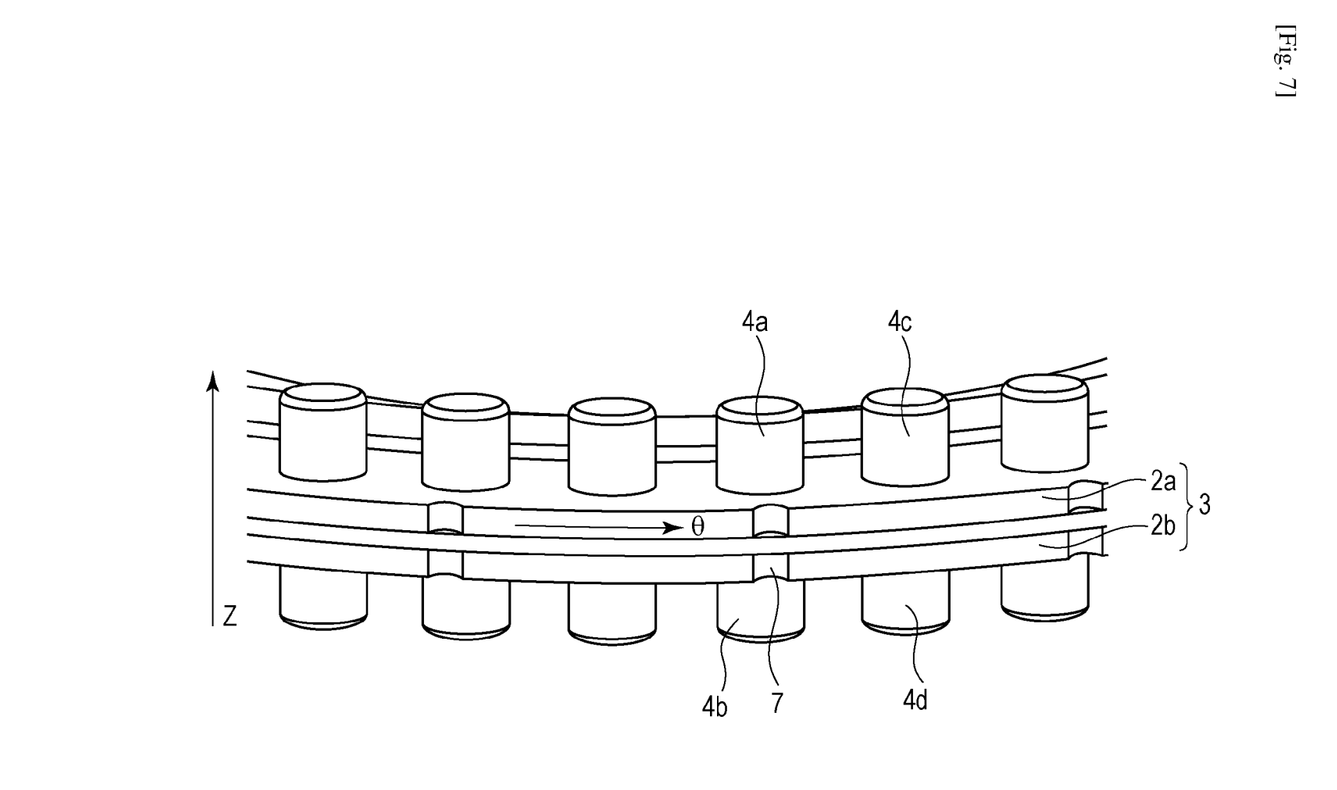
FIG. 7 is a diagram illustrating another exemplary configuration for reducing the unevenness in the bending rigidity of the vibrator.

In addition, as illustrated in FIGS. 6 and 7, portions of the protrusions 4 of the first vibrating member 2a are superposed with portions of the protrusions 4 of the second vibrating member 2b in a pressing direction, which is a direction perpendicular to the first surface and is the positive Z direction or the negative Z direction in FIG. 6 and FIG. 7. In this case, the amount of displacement in the vibrating portion 3 caused by a pressing force can be reduced, and more smooth contact between the vibrating portion 3 and the contact members can be realized.

In FIG. 7, in the pressing direction, the position of the wall portion of the first protrusion 4a and the position of the wall portion of the second protrusion 4b are superposed with each other, and the position of the third protrusion 4c and the position of the fourth protrusion 4d are superposed with each other. Consequently, the rigidity of the portion in which the positions of the wall portions are superposed with each other and the rigidity of the portion in which the positions of the third protrusion 4c and the fourth protrusion 4d are superposed with each other can be improved. Therefore, as a result of these portions receiving the pressing force that acts on the vibrating portion 3, the vibrator 1 and the driven members 31 can come into contact with and apply pressure to each other efficiently, and the durability of the vibration-type driving device 30 can be improved.

In the first embodiment, since the protrusions 4 of the vibrator 1 are formed by press working, a low-cost vibration-type driving device that includes a low-cost vibrator can be provided. In addition, since the vibrator 1 is formed by stacking the vibrating members 2 one on top of the other, the vibrator 1 can have high static rigidity and can transmit, from the friction surface fs to the contact members, a driving force that is required in order to generate a high torque.

As described above, by joining two low-cost vibrating members having the same shape together, a vibrator that has a complex shape and includes protrusions formed on the two surfaces thereof can be provided at a low cost. As a result, a low-cost high-power vibrator having a high durability can be realized.

Figure 8:
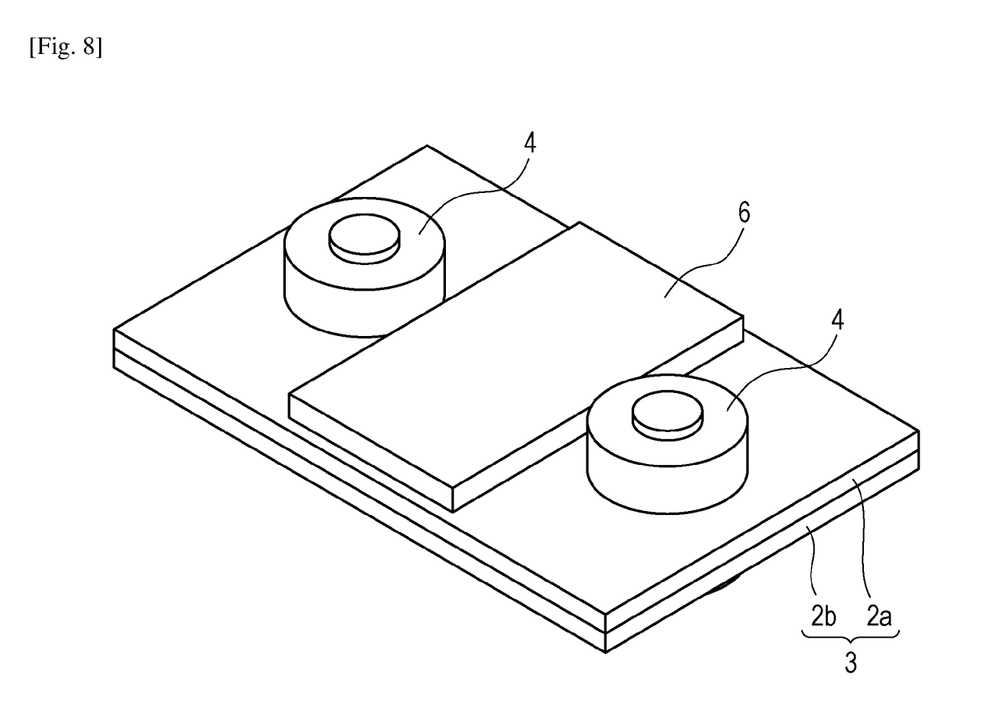
FIG. 8 is a perspective view of a vibrator according to a modification of the first embodiment.
Figure 9:
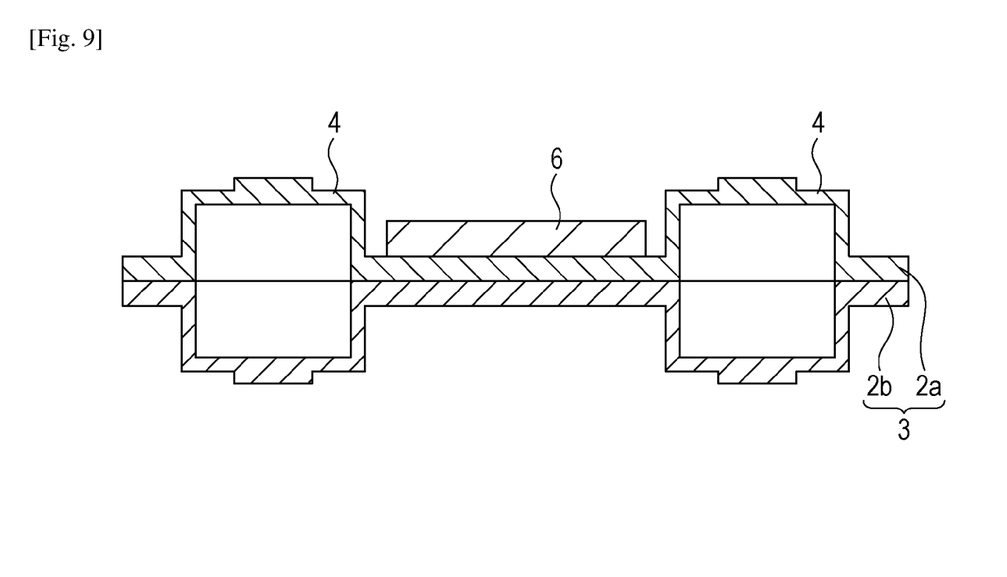
FIG. 9 is a sectional view of the vibrator according to the modification of the first embodiment.

Although an example in which the vibrating portion 3 and the piezoelectric element 6 each have a ring-like shape has been described in the first embodiment, the present invention is not limited to this, and for example, the vibrating portion 3 and the piezoelectric element 6 may each have a rectangular shape as illustrated in FIG. 8 and FIG. 9.

Second Embodiment

Figure 10:
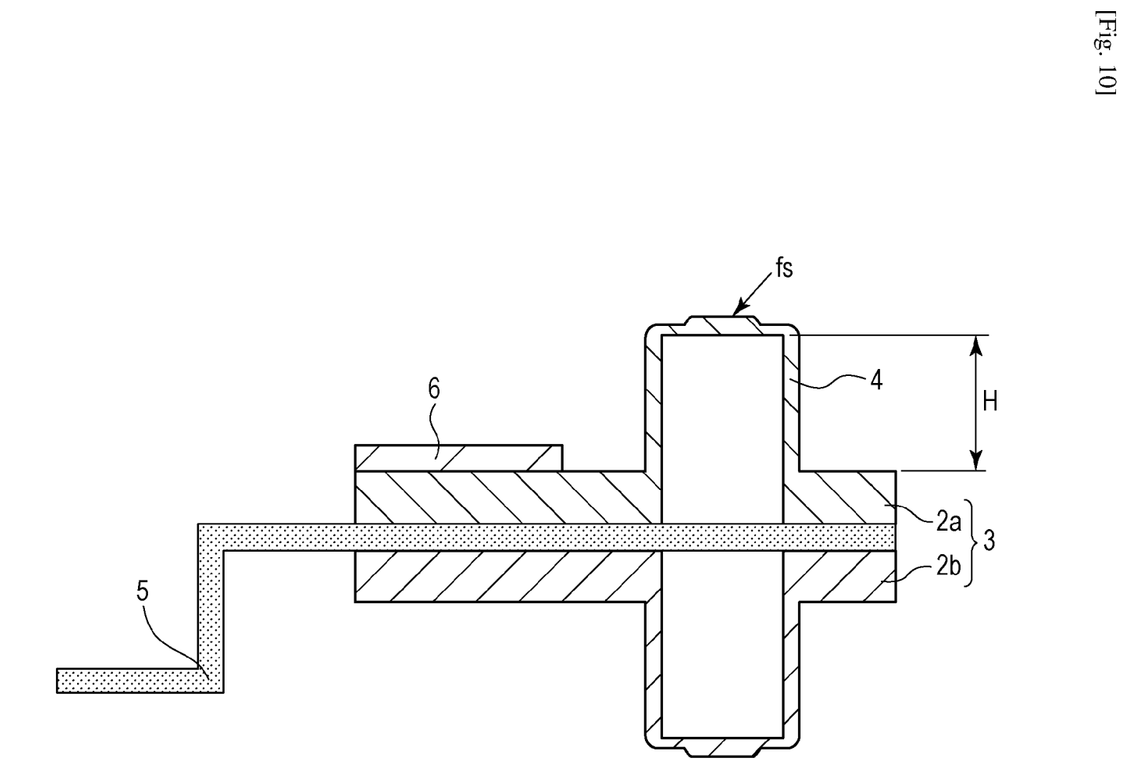
FIG. 10 is a sectional view illustrating an example of a vibrator that additionally includes a support member.

FIG. 10 is a sectional view illustrating a vibrator according to a second embodiment of the present invention. The main configuration of the vibrator is the same as that illustrated in FIG. 1. In the second embodiment, the difference from the first embodiment is that a support plate 5 having a thin-plate-like shape, which is a support member, is interposed between two vibrating members 2a and 2b, so that a flange portion that serves as a support portion extends from the vibrator in the radial direction.

The support plate 5 includes a cylinder portion that is formed by performing drawing on a flat circular plate, which has been punched out by press working. Since the support plate 5 and the vibrating members 2a and 2b are joined together in such a manner as to be superposed with one another, the thickness of the vibrating portion 3 is the sum of the thicknesses of the two vibrating members 2a and 2b and the thickness of the support plate 5.

Note that, before joining the support plate 5 and the vibrating members 2a and 2b together, the support plate 5 can be formed into any shape beforehand by punching, bending, or the like, which is a type of press working. Consequently, the range of the variations in the method of fixing the vibrator onto another component can be increased depending on the shape of the support portion. Obviously, the flange extending from the vibrator may be disposed on the inner-diameter side of the support plate 5 or may be disposed on the outer-diameter side of the support plate 5.

In the first embodiment, the vibrator 1 does not have a supporting structure, and thus, in order to mount the vibrator 1 in the vibration-type driving device 30 in practice, a supporting structure needs to be attached to a side surface of the vibrator 1 by welding or the like. There have been problems in that the reliability of a portion in which the vibrator 1 and the supporting structure are welded together and the accuracy with which the supporting structure is attached to the vibrator 1 are low and that unevenness in the rigidity in the circumferential direction is likely to be generated. As in the second embodiment, by sandwiching a flat circular plate between vibrating members and simultaneously joining the top and bottom surfaces of the flat circular plate to the corresponding vibrating members, the advantageous effects obtained in the first embodiment can be obtained, and in addition, problems related to welding can be solved.

In addition, since the support plate 5 is a low-cost component formed by punching out a plate material by a simple press working, the influence of the support plate 5 on the manufacturing costs of the vibrator is small. Although the method of joining the support plate 5 and the vibrating members 2a and 2b together may be solid-phase bonding as in the first embodiment, liquid phase bonding, such as brazing or soldering, and chemical bonding using an adhesive or the like, each of which has a lower cost than solid-phase bonding, may be employed depending on the application. Even in the case where one of these methods is employed, the support plate 5 can be used as a portion of the vibrator without causing a significant deterioration in the vibration characteristic of the vibrator.

The thickness of the support plate 5 will now be described. A supporting structure of a vibration-type driving device is required to have functional properties of receiving a motor pressing force in an axial direction so as to support a vibrator and of having high torsional rigidity against a torque, which is generated.

The axial rigidity of the support plate 5 will be described first. A force in a direction opposite to the axial direction is applied to the top and bottom surfaces of the vibrating portion 3 illustrated in FIG. 10 as a motor pressing force in the second embodiment. Thus, it is not necessary for the support plate 5 to have an axial rigidity that is as high as the axial rigidity of a support of a vibrator configured to receive, by one surface thereof, a motor pressing force, which is nearly equal to the motor pressing force received by the support plate 5. In addition, the support plate 5 may be a thin plate. In this case, when a difference occurs between the motor pressing force applied to the top surface of the vibrating portion 3 and the motor pressing force applied to the bottom surface of the vibrating portion 3, elastic deformation is likely to occur in the support portion so as to cancel out the difference between the motor pressing forces.

Regarding the torsional rigidity, the diameter of the support plate 5 and a length H of a cylinder portion illustrated in FIG. 10 are dominant in terms of torsional rigidity, and consequently, the influence of the plate thickness of the support plate 5 on the torsional rigidity is relatively small. Thus, as in the second embodiment, even in the case of using a sheet metal that has undergone bending, a sufficient torsional rigidity can be obtained.

In addition, in the second embodiment, a joint portion in which the support plate 5 and the vibrating member 2a are joined together and a joint portion in which the support plate 5 and the vibrating member 2b are joined together are located at positions each of which is spaced away from a vibration neutral plane by a distance that is half the thickness of the support plate 5, which is interposed between the vibrating members 2a and 2b, and thus, there is a possibility that the deformation that occurs in the joint portions will be increased, which in turn leads to an adverse effect on the vibration characteristic of the vibrator.

From the above standpoint, in the vibrator that includes the vibrating portion 3 having a thickness of, for example, 1 mm or more and or 5 mm less, the thickness of the support plate 5 may be half the thickness of one of the vibrating members 2a and 2b or less. In this case, the support plate 5 can be used as a portion of the vibrator without causing a significant deterioration in the vibration characteristic of the vibrator.

Third Embodiment

In a third embodiment, an example of a vibration-type driving device will be described with reference to FIGS. 11 to 14. In an apparatus that will be described below with reference to FIGS. 11 to 14, a vibration-type driving device that includes the vibrator that has been described in the first embodiment or the second embodiment can be used as a vibration-type driving device that is mounted in the apparatus.

Figure 11:
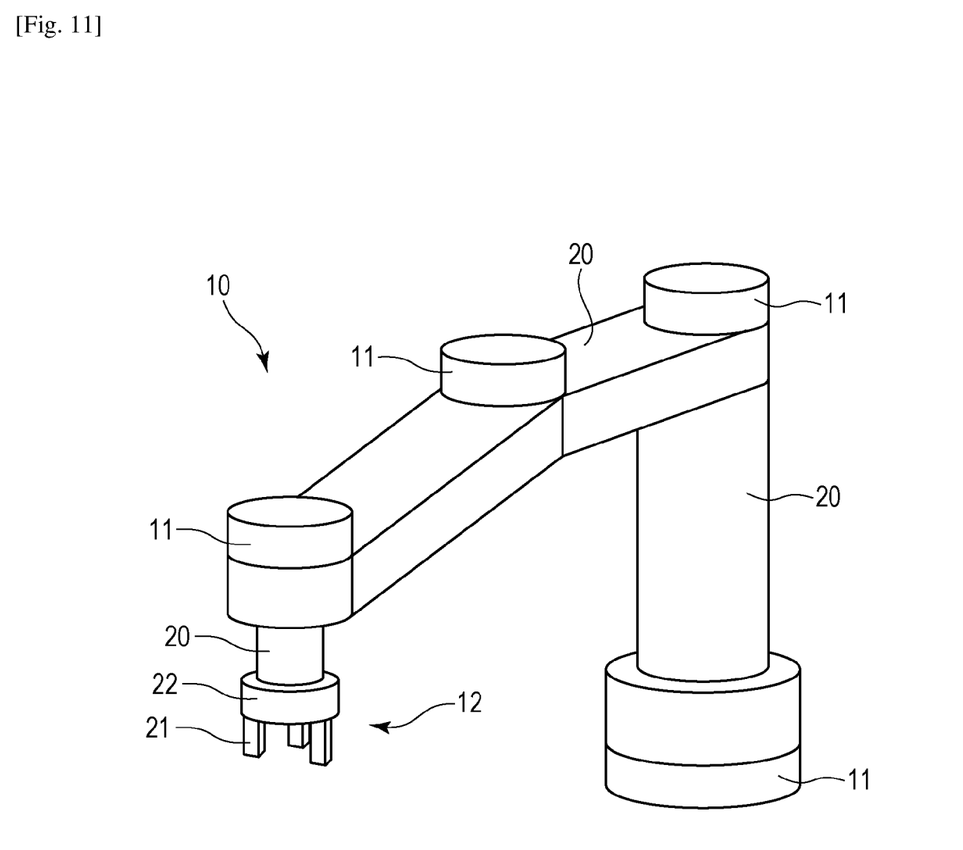
FIG. 11 is a diagram illustrating an application of a vibrator according to a third embodiment.

FIG. 11 is a perspective view of a robot that is provided with vibration-type driving devices, and FIG. 11 illustrates a horizontal articulated robot 10, which is a type of industrial robot, as an example.

In FIG. 11, the vibration-type driving devices are built into arm joint portions 11 and a hand portion 12. The arm joint portions 11 are disposed between arms 20 and connected to the arms 20. The hand portion 12 includes a holding portion 21 and a hand joint portion 22 that is disposed between the holding portion 21 and one of the arms 20, and the hand joint portion 22 is connected to the holding portion 21 and the arm 20. The vibration-type driving devices can be included in the arm joint portions 11 and the hand joint portion 22. In general, a motor output power that can realize a low rotational speed and a high torque is required for bending an arm joint portion of a robot or causing a hand portion to perform a holding operation, and thus, such a vibration-type driving device may be used.

Figure 12:
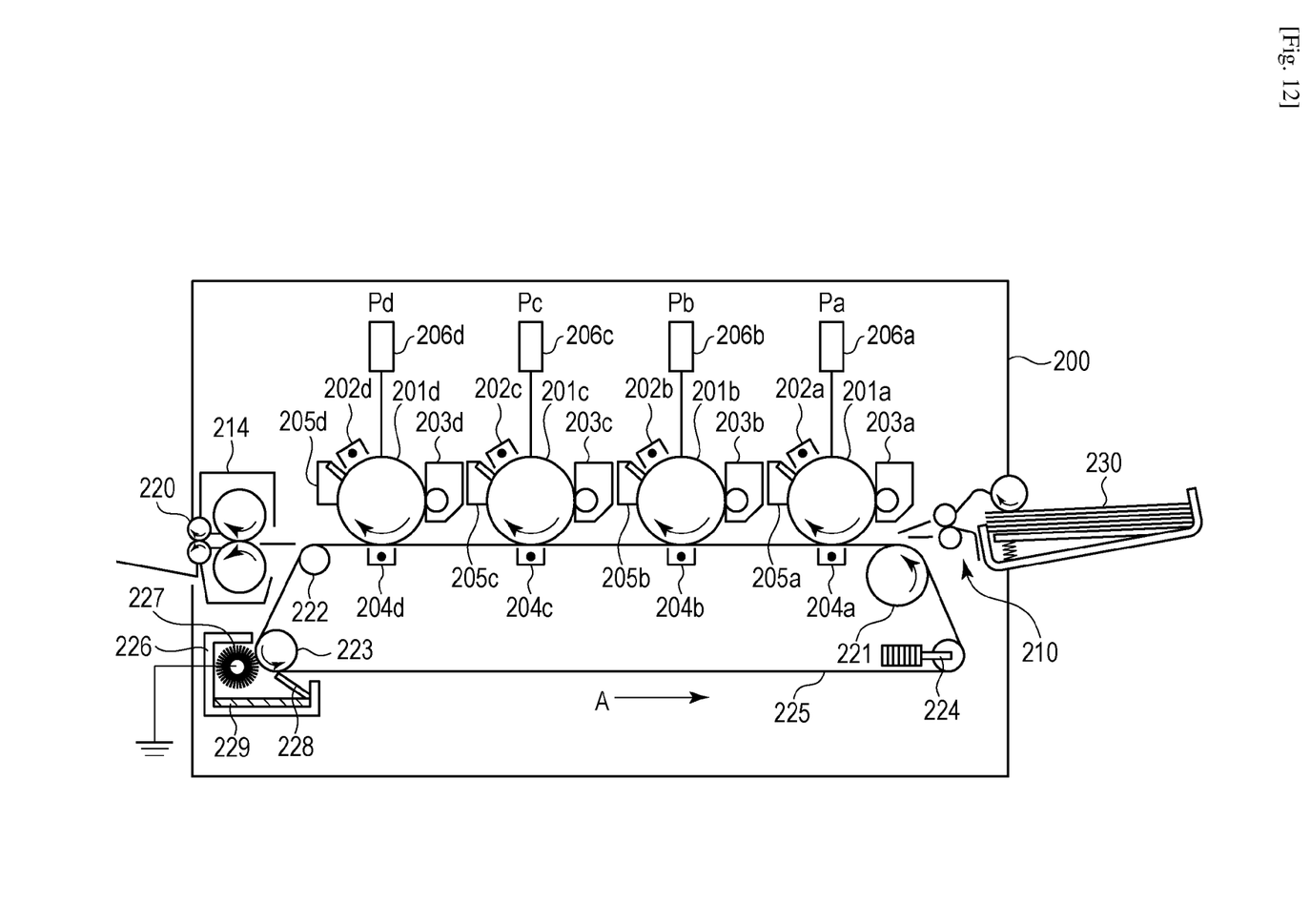
FIG. 12 is a diagram illustrating another application of the vibrator according to the third embodiment.

FIG. 12 is a sectional side view illustrating an internal structure of a color image forming apparatus that is provided with vibration-type driving devices, and FIG. 12 illustrates an image processing apparatus 200 that includes four image forming units Pa, Pb, Pc, and Pd as an example.

The image forming units Pa to Pd have substantially the same configuration and respectively have photosensitive drums 201a, 201b, 201c, and 201d, each of which is an image bearing member that is driven so as to rotate.

Chargers 202a, 202b, 202c, and 202d are respectively disposed around the photosensitive drums 201a to 201d and uniformly charge the corresponding photosensitive drums 201a to 201d. A developing unit 203a, a charger 204a, and a cleaning unit 205a are arranged around the photosensitive drum 201a in this order in a rotation direction of the photosensitive drum 201a. A developing unit 203b, a charger 204b, and a cleaning unit 205b are arranged around the photosensitive drum 201b in this order in a rotation direction of the photosensitive drum 201b. A developing unit 203c, a charger 204c, and a cleaning unit 205c are arranged around the photosensitive drum 201c in this order in a rotation direction of the photosensitive drum 201c. A developing unit 203d, a charger 204d, and a cleaning unit 205d are arranged around the photosensitive drum 201d in this order in a rotation direction of the photosensitive drum 201d.

The developing units 203a, 203b, 203c, and 203d are configured to develop electrostatic latent images formed on the corresponding photosensitive drums 201a to 201d. Each of the chargers 204a, 204b, 204c, and 204d, which are used in a transfer process, is configured to transfer a visible image, which has been developed, onto one of transfer members 230. Each of the cleaning units 205a, 205b, 205c, and 205d is configured to remove toner that remains on a corresponding one of the photosensitive drums 201a to 201d. Exposure apparatuses 206a, 206b, 206c, and 206d are respectively disposed above the photosensitive drums 201a to 201d.

A transport belt 225 is driven by a driving roller 223 so as to move in the direction of arrow A illustrated in FIG. 12 and serves as a transport unit that holds one of the transfer members 230, which are fed by a feeding unit 210, and that sequentially transports the transfer members 230 toward the image forming units Pa to Pd.

In FIG. 12, vibration-type driving devices are used as drive motors that cause the photosensitive drums 201a to 201d to rotate. In addition, another vibration-type driving device is used as a drive motor that causes the driving roller 223, which is used for driving the transport belt 225, to rotate.

Figure 13:
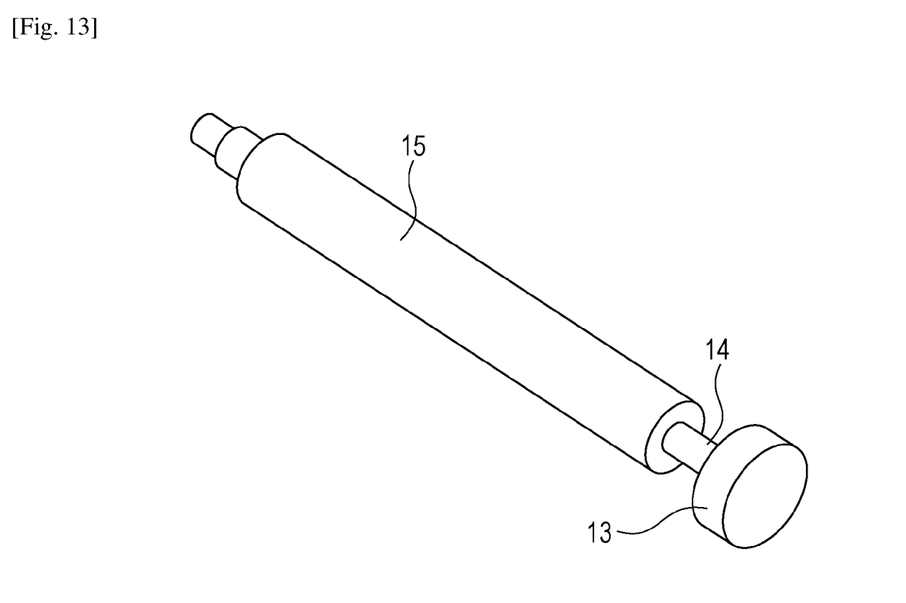
FIG. 13 is a diagram illustrating another application of the vibrator according to the third embodiment.

FIG. 13 illustrates a configuration in which a vibration-type driving device is used for driving a photosensitive drum. A vibration-type driving device 13 can be directly connected to a drive shaft 14 of a photosensitive drum 15. As a result, it is not necessary to use a speed reducing unit, such as a gear that has been required in the related art. Consequently, the probability of the occurrence of color misregistration can be reduced, and print quality can be improved.

Figure 14:
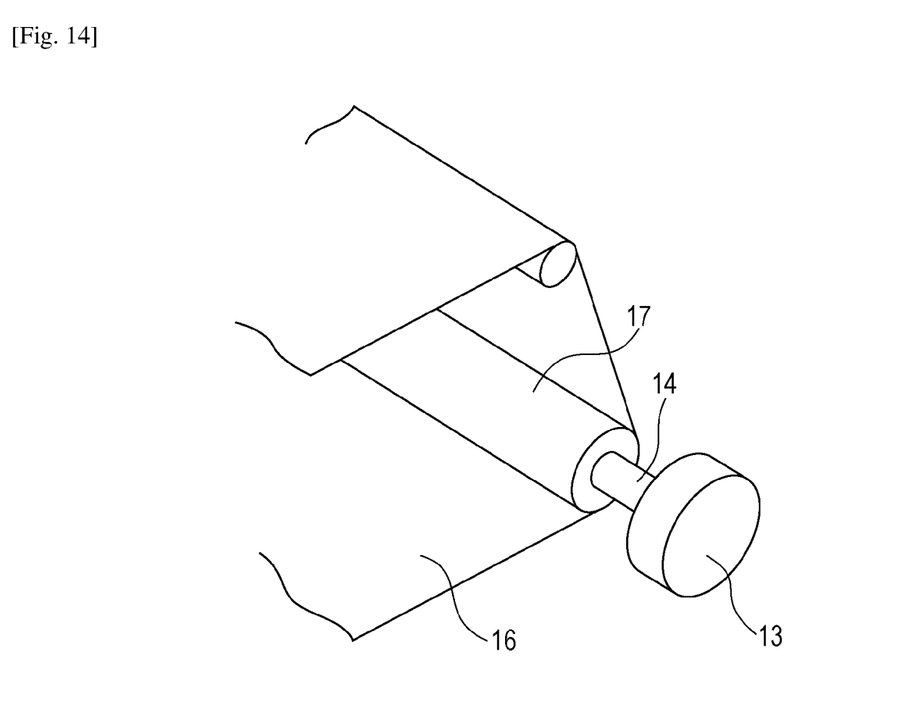
FIG. 14 is a diagram illustrating another application of the vibrator according to the third embodiment.

FIG. 14 illustrates a configuration in which a vibration-type driving device is used for driving a transport belt. In FIG. 14, the vibration-type driving device 13 can be directly connected to a drive shaft 14 of a driving roller 17. As a result, in the case of driving a transport belt 16, as in the case of driving a photosensitive drum, print quality can be improved.

Figure 15A:
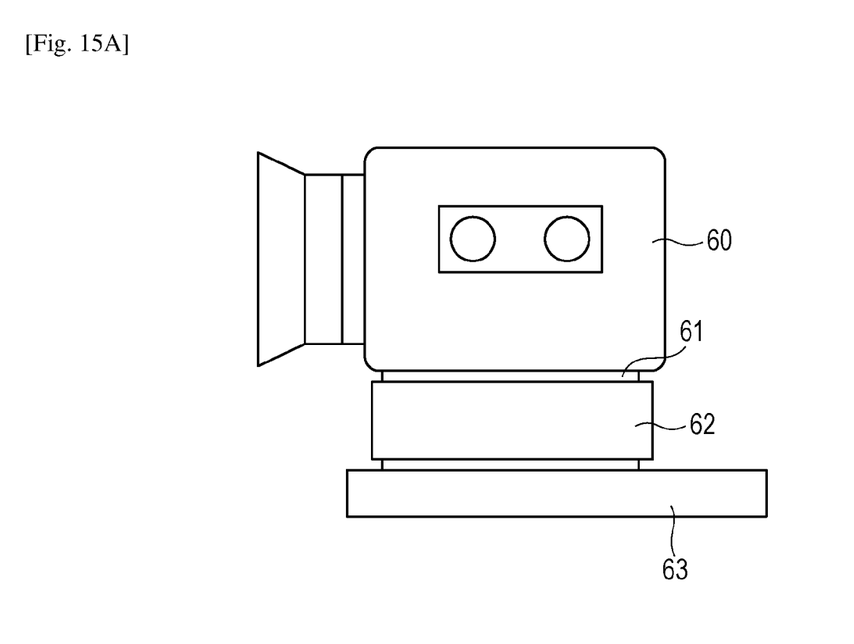
FIG. 15A is a diagram illustrating another application of the vibrator according to the third embodiment.
Figure 15B:
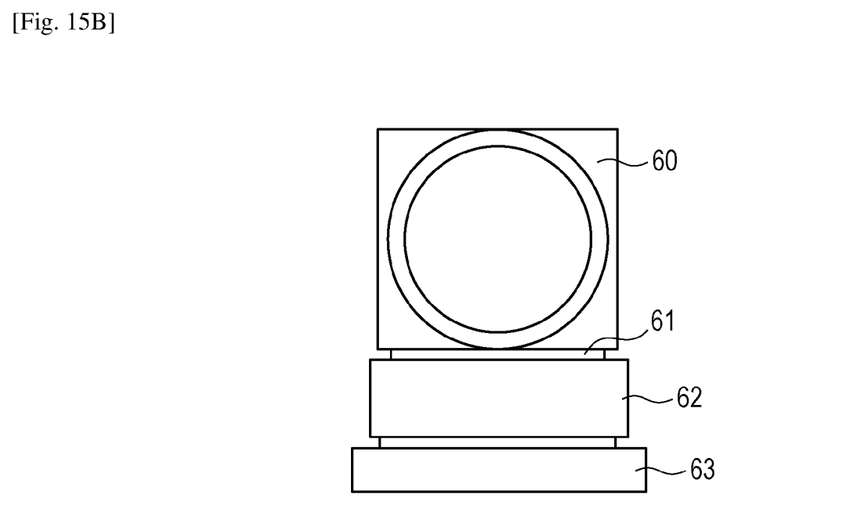
FIG. 15B is a diagram illustrating another application of the vibrator according to the third embodiment.

FIG. 15A and FIG. 15B are respectively a side view and a front view each illustrating a pan head of an imaging apparatus, such as, for example, a surveillance camera, the pan head being provided with a vibration-type driving device. A surveillance camera 60, which is an imaging apparatus, is installed on a stage 61, and the stage 61 is rotatably supported by a rotary table 62 disposed on a pan-head main body 63. The rotary table 62 is configured to be capable of rotating about a rotation axis by a vibration-type driving device 64 that is disposed between the pan-head main body 63 and the rotary table 62. Thus, as a result of rotating the rotary table 62 by using the vibration-type driving device 64, a shooting direction of the surveillance camera 60 can be changed to the horizontal direction.

The vibration-type driving device that has been described in the first embodiment or the second embodiment can be used as the vibration-type driving device 64. As a result of employing the driving device that has been described in one of the embodiments of the present invention, a thin driving device can be used as illustrated in FIGS. 15A and 15B. In addition, a direct driving method can be used, and thus, it is not necessary to use a gear reducer. Accordingly, the size of the rotary table 62 can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-089580, filed Apr. 24, 2015, which is hereby incorporated by reference herein in its entirety.

The invention claimed is:

1. A vibrator comprising:
    a first vibrating member including a first protrusion;
    a second vibrating member including a second protrusion; and
    an electric-mechanical energy conversion element that is fixed to the first vibrating member, and is provided on a side of the first vibrating member from which the first protrusion protrudes,
    wherein the first protrusion protrudes in a direction opposite to a direction in which the second protrusion protrudes,
    wherein a surface of the first vibrating member opposite to a surface on which the first protrusion is formed, and a surface of the second vibrating member opposite to a surface on which the second protrusion is formed, are directly or indirectly joined together.

2. The vibrator according to claim 1,
    wherein the first vibrating member includes a third protrusion protruding in the direction in which the first protrusion protrudes, and
    wherein the second vibrating member includes a fourth protrusion protruding in the direction in which the second protrusion protrudes.

3. The vibrator according to claim 2,
    wherein the center of the second protrusion is located between the center of the first protrusion and the center of the third protrusion in the direction perpendicular to the direction in which the first protrusion protrudes.

4. The vibrator according to claim 2,
    wherein the second protrusion is located between the first protrusion and the third protrusion in the direction perpendicular to the direction in which the first protrusion protrudes.

5. The vibrator according to claim 2,
    wherein the third protrusion has a hollow structure and includes a third wall portion, and
    wherein, in the direction perpendicular to the direction in which the first protrusion protrudes, part of the first wall portion and part of the second wall portion are positioned so as to be superposed with each other, and the part of the second wall portion and part of the third wall portion are positioned so as to be superposed with each other wherein the first protrusion includes a first wall and a first contact portion positioned at an end of the first protrusion, and
    wherein the second protrusion includes a second wall portion and a second contact portion positioned at an end of the second protrusion.

6. The vibrator according to claim 1,
    wherein the first protrusion and the second protrusion are positioned so as to be superposed with each other in a direction perpendicular to the direction in which the first protrusion protrudes.

7. The vibrator according to claim 1,
    wherein the first protrusion includes a first wall and a first contact portion positioned at an end of the first protrusion, and
    wherein the second protrusion includes a second wall portion and a second contact portion positioned at an end of the second protrusion.

8. The vibrator according to claim 1,
    wherein the first vibrating member is fixed to the second vibrating member with an adhesive interposed between the first vibrating member and the second vibrating member.

9. The vibrator according to claim 1, further comprising:
    a support member that is disposed between the first vibrating member and the second vibrating member.

10. The vibrator according to claim 1,
    wherein the first vibrating member and the first protrusion are integrally formed, and the second vibrating member and the second protrusion are integrally formed.

11. The vibrator according to claim 10,
    wherein the first protrusion and the second protrusion are formed by press working.

12. The vibrator according to claim 1,
    wherein the first vibrating member and the second vibrating member each have a ring-like shape.

13. A vibration-type driving device comprising:
    the vibrator according to claim 1; and
    a driven member that is brought into contact with the vibrator.

14. The vibration-type driving device according to claim 13,
  wherein the driven member is driven as a result of applying an alternating-current voltage to the electric-mechanical energy conversion element.

15. A robot comprising:
an arm; and
a joint portion that is connected to the arm,
wherein the joint portion includes the vibrator according to claim 1.

16. An image forming apparatus comprising:
an image bearing member;
a transport belt that is disposed so as to face the image bearing member; and
the vibrator according to claim 1 that is configured to drive the image bearing member so that the image bearing member rotates.

17. An image forming apparatus comprising:
an image bearing member;
a transport belt that is disposed so as to face the image bearing member; and
the vibrator according to claim 1 that is configured to drive the transport belt.

18. A pan head comprising:
an imaging apparatus;
a rotary table on which the imaging apparatus is installed; and a vibration-type driving device that includes the vibrator according to claim 1 that is configured to drive the rotary table.

* * * * *